United States Patent [19]

Ueda et al.

[11] Patent Number: 4,958,815
[45] Date of Patent: Sep. 25, 1990

[54] TABLE EQUIPMENT

[75] Inventors: Katsunobu Ueda; Mitsuo Sumiya, both of Yokohama, Japan

[73] Assignee: Kabushiki Kaisha Toshiba, Kawasaki, Japan

[21] Appl. No.: 300,596

[22] Filed: Jan. 23, 1989

[30] Foreign Application Priority Data

Feb. 2, 1988 [JP] Japan .................. 63-21214

[51] Int. Cl.$^5$ .............................. B23Q 3/18
[52] U.S. Cl. ........................ 269/58; 187/94; 212/196; 212/197; 269/73
[58] Field of Search ............ 187/94; 212/196, 197; 269/58, 60, 73, 254 R, 289 R

[56] References Cited

U.S. PATENT DOCUMENTS

| | | | |
|---|---|---|---|
| 224,862 | 2/1880 | Bigelow | 187/94 |
| 359,437 | 3/1887 | Foster | 187/94 |
| 4,179,947 | 12/1979 | James | 187/94 |
| 4,353,170 | 10/1982 | Jordan | 269/58 |

FOREIGN PATENT DOCUMENTS

| | | | |
|---|---|---|---|
| 0029048 | 3/1977 | Japan | 187/94 |
| 62-68207 | 3/1987 | Japan . | |
| 62-68208 | 3/1987 | Japan . | |
| 62-68209 | 3/1987 | Japan . | |
| 62-68210 | 3/1987 | Japan . | |
| 1162943 | 9/1969 | United Kingdom | 187/94 |

OTHER PUBLICATIONS

Proceeding 1986 Autumn Paper presented at the Meeting of the Japan Soc. of Precision Engg., (1986) in Japan No. 551, pp. 495–496.

*Primary Examiner*—J. J. Hartman
*Attorney, Agent, or Firm*—Cushman, Darby & Cushman

[57] ABSTRACT

Table equipment which comprises a frame, a table that can fix an object and move relative to the frame, a table guide for guiding the movable table on the frame, in a line inclined to the horizontal plane, a power source for driving the table along the table guide, a power drive connection for drivingly connected the driving power source with the table, and a force applying member applying to the table a force which counterbalances the gravity at the table and the object mounted thereon, the force applying member having a counterweight smaller than the total weight of the movable table and the mounted object.

7 Claims, 4 Drawing Sheets

TABLE EQUIPMENT

BACKGROUND OF THE INVENTION

1. Field of the Invention

This invention relates to a table equipment having a table which moves in a line inclined to the horizontal plane.

2. Description of the Related Art

Generally, the table equipment used in machine tools or other machines has a table which moves along a horizontal plane.

A type of table equipment having a table which can move in the vertical direction is required for some machining methods.

When a table is moved in the vertical direction, the driving force to move the table varies with its moving direction since the table is subjected to the effect of gravitational acceleration. More specifically, to raise the movable table, a driving force which is the frictional force plus its gravity is required. To lower the movable table, a driving force which is the frictional force less its gravity is required.

Hence, the table equipment requires a motor which outputs force great enough to raise the table. The greater the output force of a motor, the larger the motor, and the more expensive the motor. The table equipment must inevitably be relatively large as a whole and comparatively expensive. A motor which generates a large driving force has a large inertia during its operation and has a poor response to operation signals. Therefore, it is impossible to position the movable table at high speed.

Further, it is difficult to precisely control the operation of the driving motor since the load on the motor varies in the rising and lowering of the movable table. To take an example, when a DC servo motor is used as a driving motor, it is necessary to change the gain of the control loop in the control device such as a servo amplifier according to the moving direction of the movable table. Control such as this is extremely difficult when moving the movable table at high speed and position it in short cycles.

Table equipment which solves the above problem is disclosed in Japanese Patent Laid-Open Nos. 62-68207, 62-68208, 62-68209 62-68210, all filed by the assignee of the present application. In each of them, a movable table is connected with a counterweight equal to the total weight thereof in such a way that the counterweight can move vertically, thereby eliminating the effect of the gravity acting on the movable table. This makes it possible to position the movable table accurately at high speed and in short-time cycles.

In any of the above inventions, however, the equipment is large in overall size because the weight of the counterweight needs to be equal to that of the movable table and the members fixed thereon.

SUMMARY OF THE INVENTION

This invention has been made to solve the above problem and has as its object to provide a compact table equipment capable of moving, at high speed and by a relatively small driving force, a movable table, the moving vector of which includes a component in the direction of gravitational acceleration and also capable of positioning the movable table accurately and in short-time cycles.

In order to achieve the above object, table equipment comprises a frame; a table for supporting a member and movable relative to said frame; a guide for guiding said table on said frame, in a line inclined to the horizontal plane; a power source for driving the table along said guide; connecting means for drivingly connecting said driving power source with said table; and means for applying to said table a force counterbalancing said table and the member supported thereon; and said force applying means has a counterweight smaller than the total weight of said table and the member supported thereon.

This table equipment requires only almost equal driving forces to move the table upwards and downwards owing to said force applying means having a counterweight smaller than that of the movable weight. Therefore, by using an easy-to-control small driving power source, the table can be moved at high speed and positioned accurately in short-time cycles. Further, since a small counterweight can be used, the overall equipment can be manufactured in a compact construction and with lower cost, as a result.

In a preferred embodiment of this invention, the force applying means includes elongated flexible members and pulley mechanisms to guide the flexible members, the said flexible member having a first part thereof connected to the counterweight and a second part connected to the movable table. Therefore, the force applying means can be formed in a compact and relatively simple construction.

In another embodiment of this invention, the frame has a vertical fluid chamber containing a viscous fluid and the counterweight moves in the vertical direction in the fluid in the fluid chamber. Therefore, the counterweight and the fluid chamber act as a fluid damper. As a result, the vibration of the counterweight, consequently, of the movable table can be prevented, thus allowing the movable table to move smoothly.

The other features and advantages of this invention will be readily appreciated by reading the following detailed description with reference to the accompanying drawings.

DETAILED DESCRIPTION OF THE PREFERRED EMBODIMENTS

Figure 1:
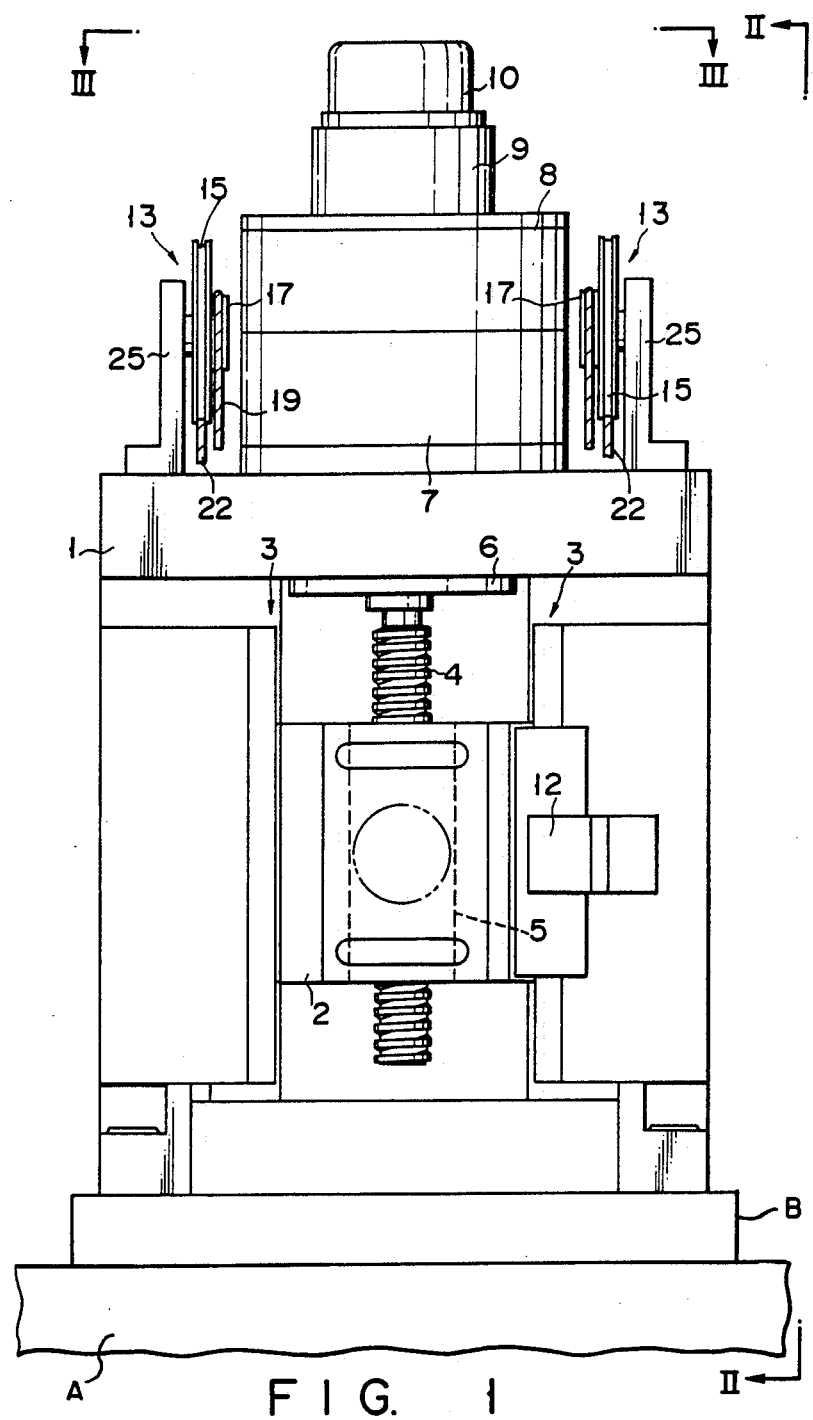
FIG. 1 is a schematic elevation of the table equipment according to an embodiment of this invention.
Figure 2:
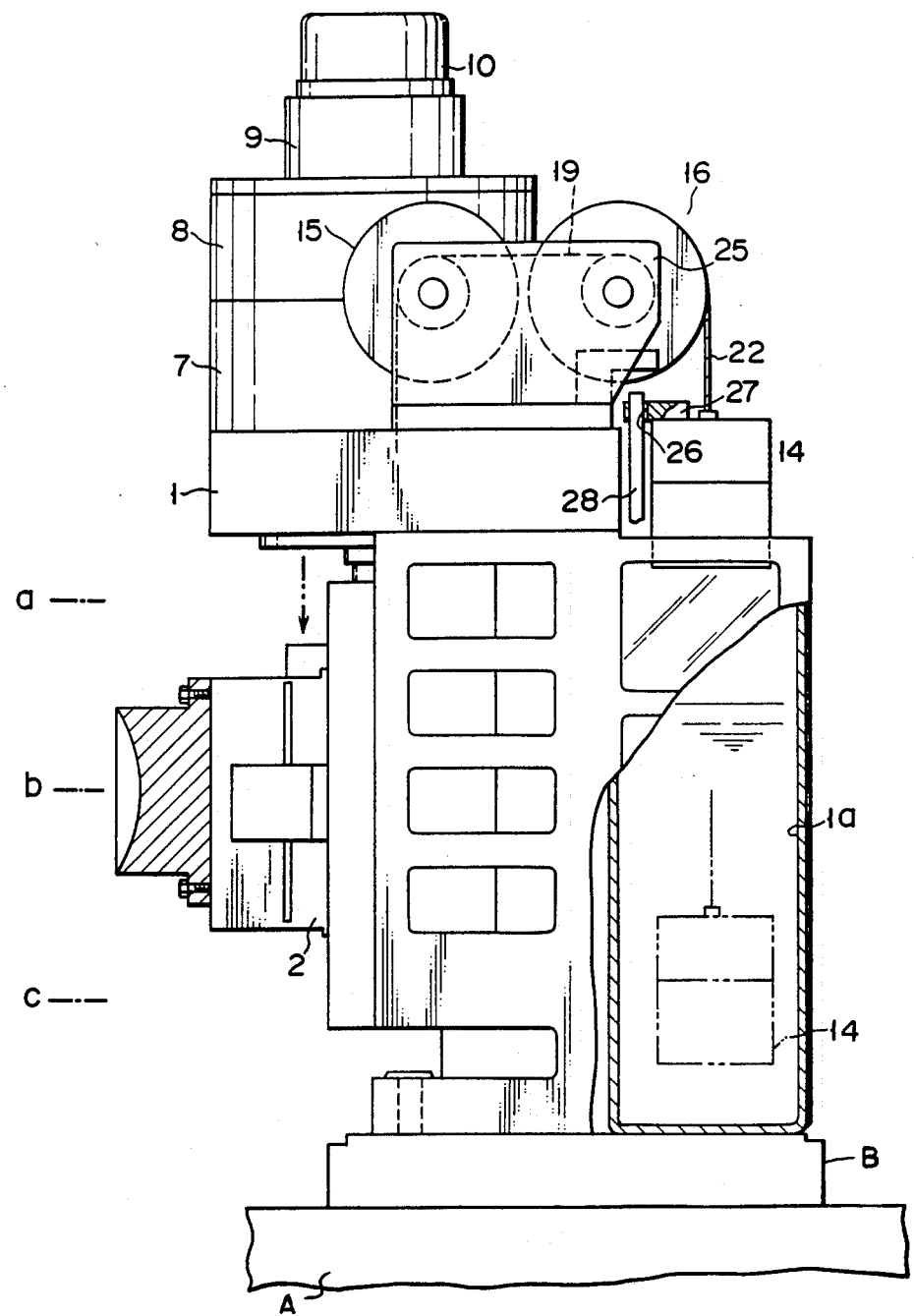
FIG. 2 is a schematic side view as seen in the direction of the line II—II of FIG. 1.

As shown in FIGS. 1 and 2, the table equipment according to an embodiment of this invention has frame 1 and movable table 2 is mounted to frame 1 in such a way that movable table 2 can move in the vertical direction.

Figure 3:
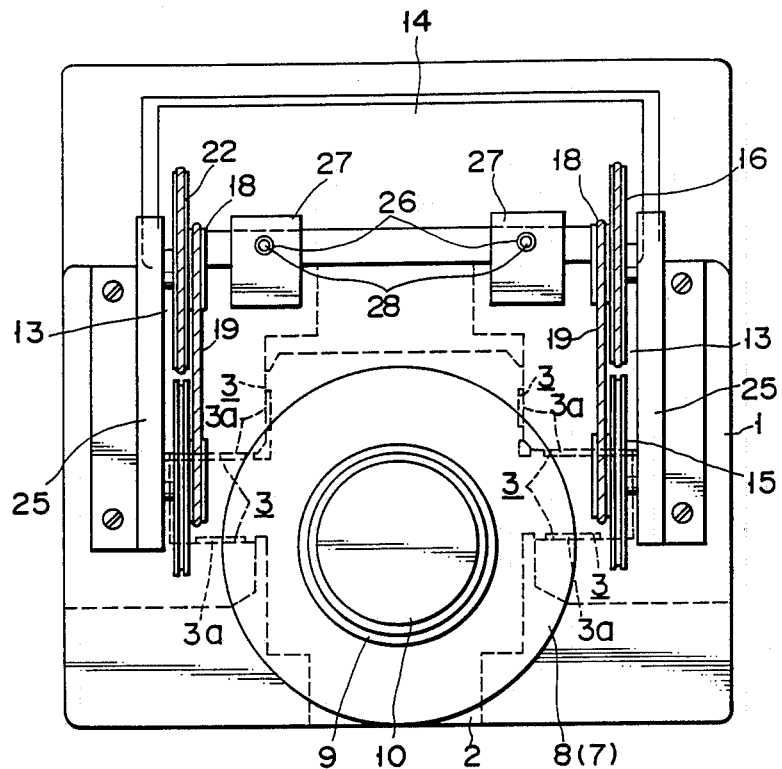
FIG. 3 is a schematic plan view as seen in the direction of the line III—III of FIG. 1.

As illustrated in FIG. 3, this movable table 2 is guided by vertical guide 3 constututed by a hydrostatic bearing in this embodiment. The hydrostatic bearing constituting guide 3 has, between the guideway of frame 1 and the slideway of table 2, a pocket into which a pressure fluid is supplied from a pressure fluid source (not shown) and thereby movable table 2 is moved vertically. Pocket 3a of this hydrostatic bearing is sealed liquid-tightly.

Table 2 is drivingly connected through connecting means to the driving power source.

Referring to FIG. 1, the connecting means has screw receiving member 5 provided in Table 2 and driving screw 4 rotatably supported through screw bearing 6 by frame 1 and drivingly engaging with screw receiving member 5. In this embodiment, driving screw 4 is directly connected with a DC motor which is the driving power source. Driving motor 7 is controlled by tachometer-generator 8. When driving motor 7 rotates as its operation is controlled by tachometer-generator 8, movable table 2 is moved vertically via driving screw 4 and screw receiving member 5.

The angle of rotation of driving screw 4 is detected by rotary encoder 10 connected to driving motor and tachometer-generator 8 through coupling 9. The rotating direction and angle of driving motor 7 are selected by a drive control system (not shown) such that movable table 2 can be moved to the raised position a, the mid-position b and the lowered position c shown in FIG. 2. The moved position of movable table 2 is detected by linear encoder 12. The position information of movable table 2 detected by linear encoder 12 is sent to the above-mentioned drive control system.

On the other hand, force applying means is connected to movable table 2, the said force applying means being used to apply to movable table 2 a force which, acting in the opposite direction, counterbalances the force effected by gravitational acceleration to the total weight of movable table 2 and other members mounted thereon, e.g. screw holding member 5 and the article to be moved.

As shown in FIGS. 1 and 3, there are provided in this embodiment pulley mechanisms 13 provided at the upper left and upper right (as seen in FIGS. 1 and 3) of frame 1, counterweights 14 and elongated flexible members connecting movable table 2 with counterweights 14.

Figure 4:
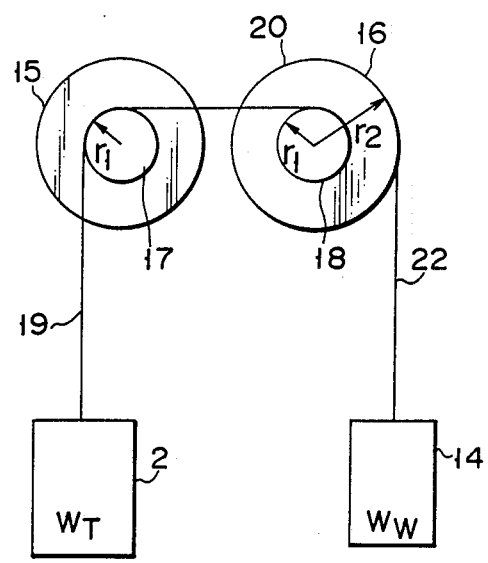
FIG. 4 is a diagram to explain the principle of the force applying means.

As indicated in FIG. 4 schematically illustrating the principle of the force applying means, pulley mechanisms 13 each have two stepped pulleys 15 and 16 fixed to the upper position of the frame and aligned in the front-rear direction. Referring to FIG. 4, first flexible wire 19, which is at one end connected to movable table 2, is wound around small-diameter portion 17 of stepped pulley 15 shown at left in this figure and is fixed at the other end to small-diameter portion 18 of stepped pulley 16 at right. Therefore, stepped pulleys 15 and 16 rotate simultaneously as small-diameter portions 17 and 18 are driven by first wire 19. Wire 22, which is at one end connected to counterweight 14, is wound around large-diameter portion 20 of stepped pulley 16 at right and is fixed at the other end to large-diameter portion 20.

These pulleys 15 and 16 are rotatably mounted to support plates 25 at the upper position of frame 1.

Referring to FIG. 2, guide plates 27 are mounted to the top surface of counterweight 14. Each guide plate 17 has formed therein a guide hole 26 into which guide rod 28 is inserted and guide rod 28 is fixed to frame 1 and extends in the vertical direction. Therefore, when counterweight 14 moves up and down, it is guided by guide rod 28, so that it is prevented from swinging.

If the total weight of whole movable table 2 including movable table 2 and the members mounted thereon is denoted by WT, the weight of counterweight 14 by Ww, the radius of small-diameter pulley 18 by r1 and the radius of large-diameter pulley 20 by r2, the followings equality will be established in pulley mechanism 13.

$$WT \cdot r1 = Ww \cdot r2$$

Assuming, for example, the radius r1 of above-mentioned pulley 18 is 22 mm and the radius r2 of large-diameter pulley 20 is 55 mm, the following relation should hold between WT and Ww.

$$Ww = (2/5) WT$$

Therefore, the weight Ww of counterweight 14 can be made smaller than the total weight WT of movable table 2.

The table equipment described above can be used for machine tools such as milling machines. Also, it can be used for the table equipment of semiconductor wafer aligners. When this table equipment is used for a semiconductor wafer aligner, mounting base 2a to mount a semiconductor wafer on movable table 2 is fixed in operative relation to an aligner. As shown in FIGS. 1 and 2, the table apparatus according to the present invention can be movably mounted on horizontal plane B of the horizontal table A via frame 1 in any known manner.

In the above-mentioned table equipment, the total weight of movable table 2 and the members mounted thereon is balanced through pulley mechanism 13 with counterweight 14. Therefore, when movable table moves upwards, through a load due to gravitational acceleration acts in its moving direction, the load is offset by counterweight 14. When movable table 4 moves downwards, the load due to gravitational acceleration acts on counterweight 14 but this load is offset by the load of movable table 2 moving in the opposite direction. Thus, when movable table 2 moves up or down, the effect of gravitational acceleration is always prevented. Hence, it is possible to move movable table 2 with a small force of the same magnitude both in raising and lowering it.

Therefore, according to this invention, it is not necessary to use an expensive, high-output driving motor to cope with a large load that occurs in raising movable table 2. Counterweight 14 of a small size can be used. Accordingly, table equipment can be manufactured in a compact size and with low cost. Generally, when a motor with a capacity to generate a large driving force is used, the large inertia during operation and the low response velocity of this type of motor make it impossible to position the movable table at high speed. In contrast, in the table equipment according to the above-mentioned embodiment, a motor with a relatively small driving force can be used for the driving power source. Further, since the rise characteristics of the motor can be maintained equal even when its rotational direction is changed, the motor operation can be controlled easily and, therefore, the table equipment can be made to operate accurately and at high speed.

Further, because the force applying means of the above-mentioned table equipment has pulley mechanism 13 and this pulley mechanism 13 balances the movable table with counterweight 14 through wires 19 and 20, can be formed in a compact and simple construction. In the embodiment shown in the accompanying drawings, each pulley mechanism 13 incorporates two stepped pulleys 15 and 16, but a suitable mechanism such as differential pulleys may be used instead of the stepped pulleys.

As shown in FIG. 2, it is possible to install fluid chamber 1a containing a viscous fluid in frame 1 and let counterweight 14 move in the fluid in the chamber. In this case, it is desirable to provide space between counterweight 14 and the internal walls of fluid chamber 1a to ensure that the fluid can move through the space when counterweight 14 moves. If counterweight 14 and fluid chamber 1a are formed as described, they serve as a fluid damper when counterweight 14 moves in fluid chamber 1a, lessening or preventing the vibration of counterweight 14 and wire 22 when counterweight 14 goes up and down and allowing movable table 2 to move smoothly.

In the above embodiment, DC servo motor 7 is used as a driving power source, but a suitable driving power source such as a linear motor or an ordinary friction drive mechanism may be used.

Though movable table 2 of the above-described table equipment moves vertically, this invention is obviously applicable to table equipment having a movable table that moves tilted with respect to the vertical direction.

It is to be understood that this invention is not limited to the above preferred embodiment but it is obvious that various changes and modifications may be made in the invention without departing from the scope of the appended claims.

What is claimed is:

1. Table equipment having a table for supporting an object to be positioned accurately and in short time cycles, comprising:
    a frame;
    a table for supporting an object, and movable relative to said frame;
    a guide for guiding said table on said frame, in a line inclined to the horizontal plane;
    a power source for driving said table along said guide;
    connecting means for drivingly connecting said driving power source with said table; and
    means for applying to said table a force to counterbalance said table and said object supported thereon and including a counterweight lighter than the total weight of said table and said object supported thereon;
    said frame having a vertical fluid chamber means for dampening the vibration generated by the force applying means, including, mounted on said frame containing a viscous fluid for movingly receiving said counterweight, thereby causing said table to move smoothly.

2. The table equipment according to claim 1, wherein said force applying means includes an elongated flexible member and a pulley mechanism to guide said flexible member, said elongated flexible member having a first part connected to said counterweight and a second part connected to said table.

3. The table equipment according to claim 2, wherein said pulley mechanism comprises a pulley having a large-diameter portion around which said first part is wound, and small-diameter portion around which said second part is wound, said large-diameter portion and small-diameter portion being rotable together with each other.

4. The table equipment according to claim 3, wherein said frame has a guide rod extending in the vertical direction for guiding said counterweight, and said counterweight has a plate member slidable on said guide rod.

5. The table equipment according to claim 4, wherein said fluid chamber is formed in dimensions such that there is space around said counterweight through which the viscous fluid flows.

6. The table equipment according to claim 5, wherein said movable table can move in a horizontal plane.

7. The table equipment according to claim 6, further comprising a horizontal table supporting said frame such that said frame is movable.

* * * * *